July 4, 1961
R. E. STANDLICK
2,991,015
COMPONENT MIXTURE DELIVERY GUN
Filed Dec. 24, 1958
4 Sheets-Sheet 1
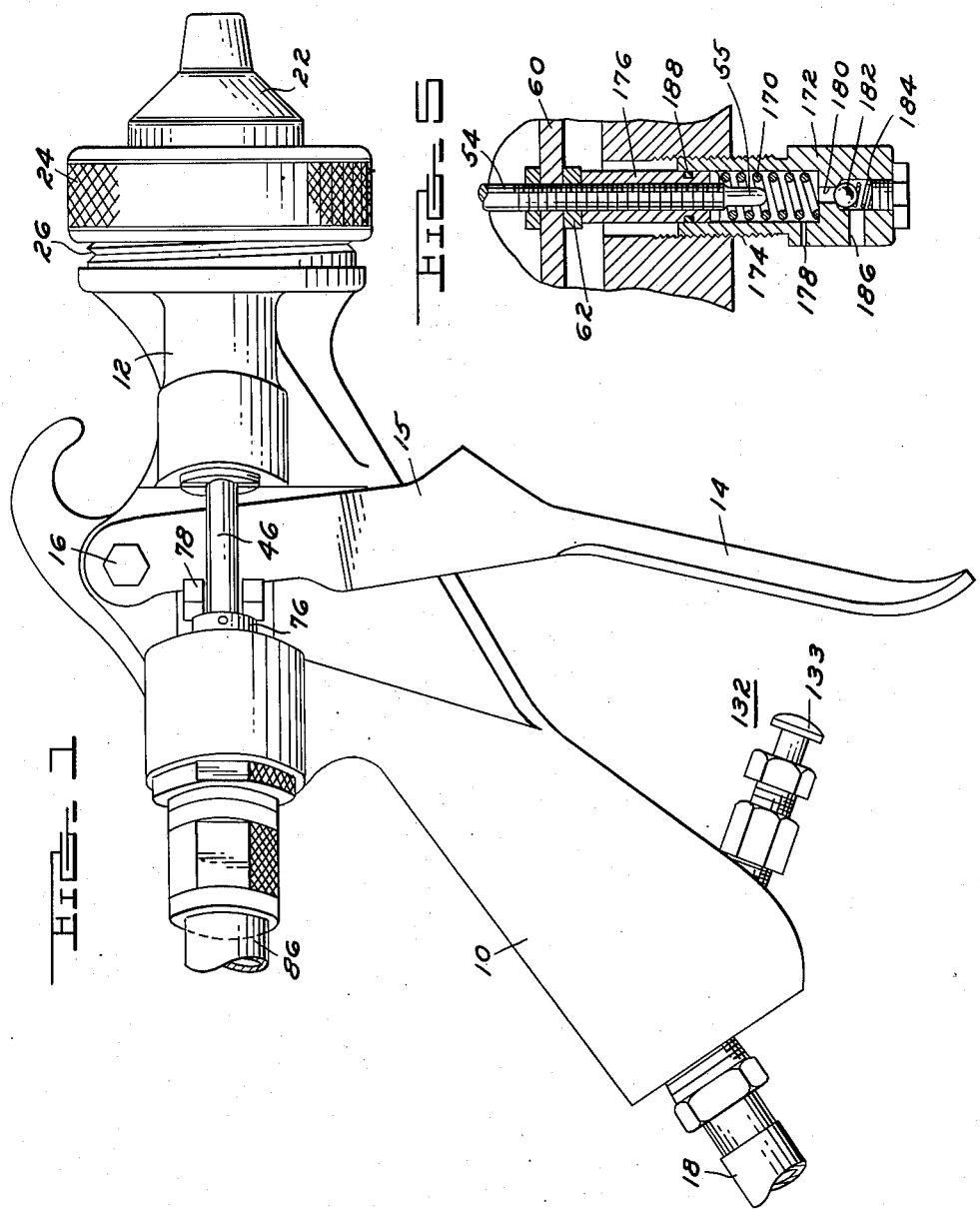
INVENTOR.
RONALD E. STANDLICK
BY
Burton & Parker
ATTORNEYS

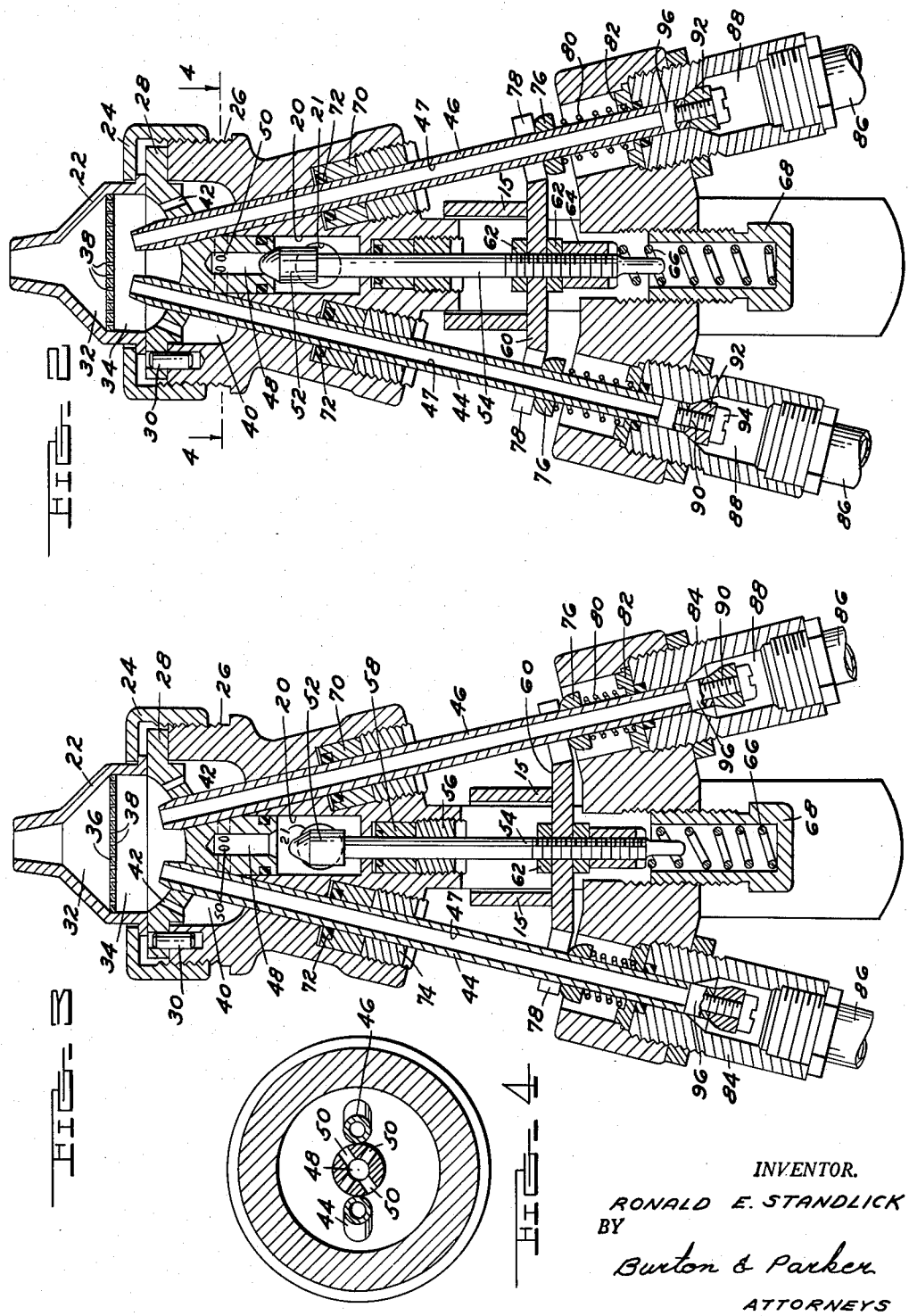

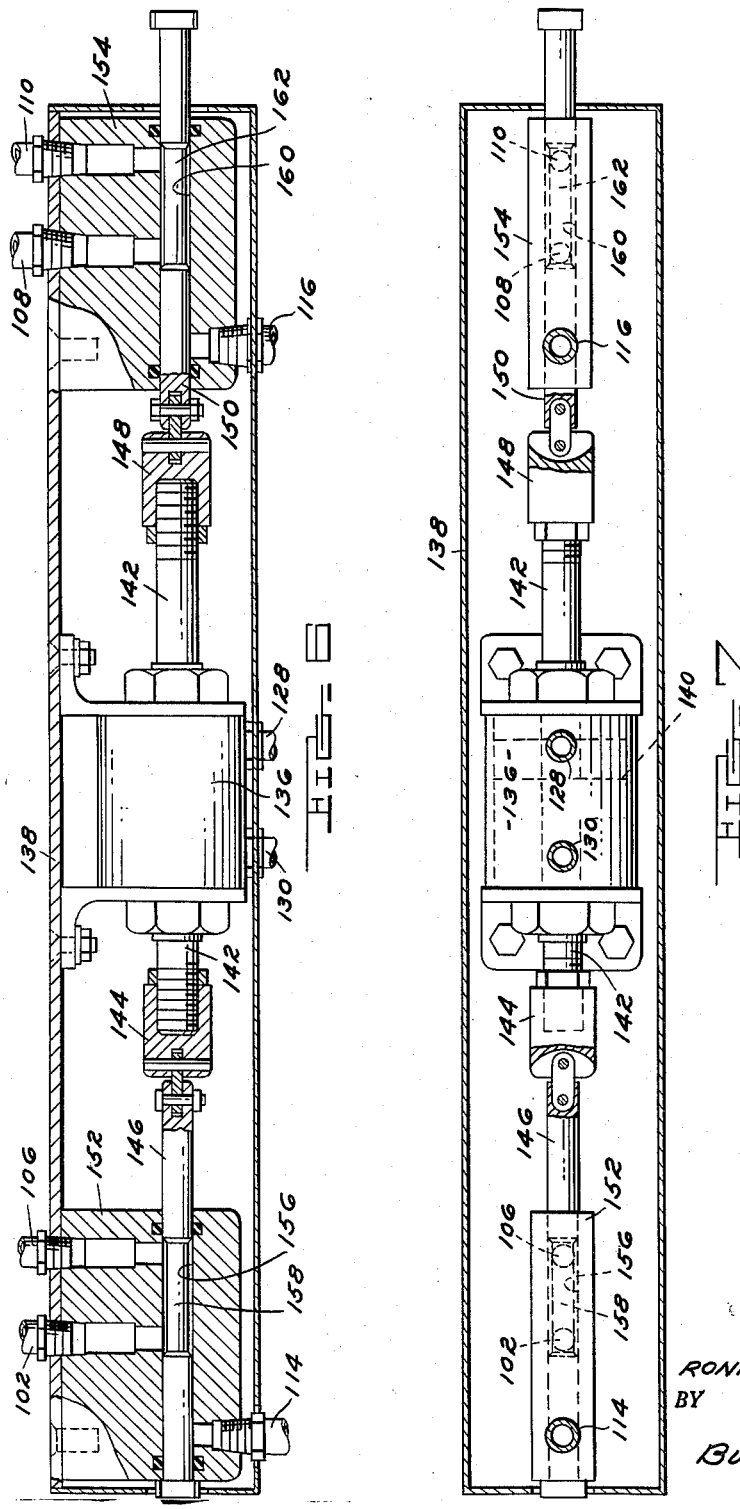

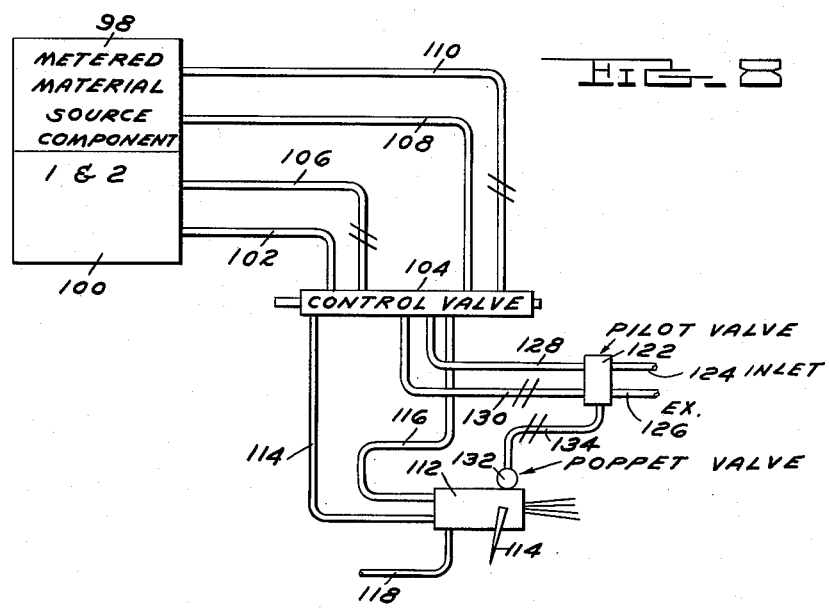
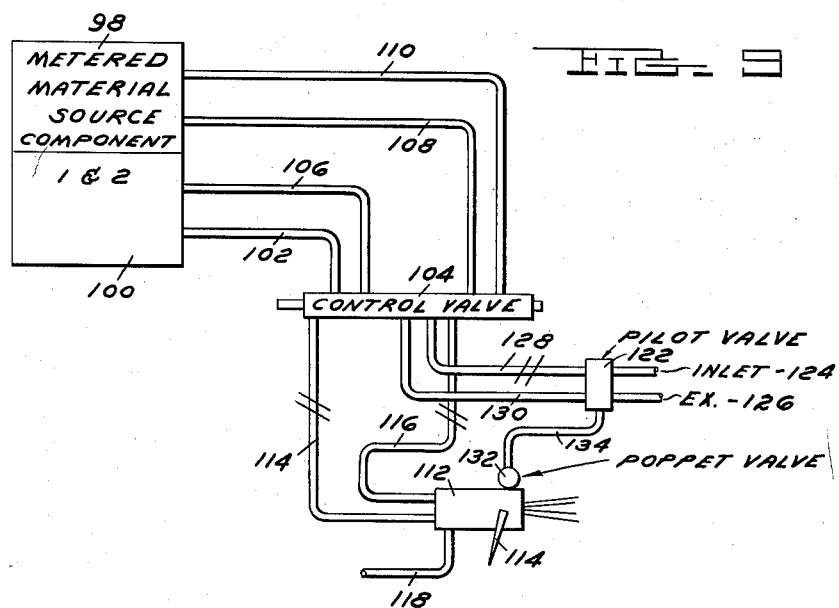

United States Patent Office 2,991,015
Patented July 4, 1961

2,991,015
COMPONENT MIXTURE DELIVERY GUN
Ronald E. Standlick, Royal Oak, Mich., assignor to Pyles Industries, Inc., Detroit, Mich., a corporation of Michigan
Filed Dec. 24, 1958, Ser. No. 782,923
10 Claims. (Cl. 239—127)

This invention relates to an improved device or gun for control delivery of a mixture of ingredients or component materials.

An object is the provision of a gun of the character just set forth designed to accomplish the mixture of component materials or ingredients which chemically interact with each other so as to provide a plastic composition that may be delivered instantly by the gun to any desired location for use.

This particular gun is also called a multiply spray gun. There are many places in industry where two or more chemicals are mixed together and react very quickly to form a suitable plastic mixture as, for example, in the formation of plastic sponge material or certain resinous products or ingredients. The constituent components which go to make up the mixture have to be stored and kept separately and their reaction occurs so rapidly that the mixture must be delivered substantially instantly to a point at which it is to be used.

Guns of this type have been proposed for use before but one difficulty has been that the gun is apt to become clogged with the reaction mixture unless the components are cleaned cut out of the gun completely following each use of the gun. One solution of this difficulty has been to circulate solvent material through the gun following use but such solvent material should all be cleaned out of the gun before it is re-used.

An object of applicant's invention is to provide a gun which is so constructed that any mixture remaining following use is blown out of the gun by the air pressure which is used to exhaust the mixture from the gun. The construction is such that following use and upon the shutting off of the delivery of component materials to the gun, the air pressure is allowed to remain on for a short period of time so as to blow all such remaining reaction mixture out of the gun.

Another object is the provision of a gun so constructed and having associated apparatus coupled therewith that upon the inception of an operation of use air is first blown through the gun and then the component materials of reaction are admitted into the gun and their admixture occurs and such reaction mixture is discharged under air pressure and upon discontinuance of delivery of reaction components to the gun, the air is permitted to continue to pass therethrough for a limited period of time.

Another object is the provision of a gun which is adapted to ensure rapid and complete admixture of component ingredients to form a reaction product within the mixing chamber and to discharge such reaction product from the mixing chamber as soon as it is formed and to carry out such operation under controlled continuation as desired.

A further object is the provision of a gun having a mixing chamber divided into two compartments separated from each other by a foraminous partition and to provide means for delivering separately to one compartment the ingredients to be mixed therein and for delivering air to said compartment in such a manner as to diffuse said ingredients thoroughly with each other and then to inject the reaction mixture formed by said ingredients into the other compartment of the mixing chamber for discharge therefrom through a suitable nozzle or the like.

Another object is the provision of a gun as described wherein valve means is provided to control the separate delivery of components into the mixing chamber and valve means is provided to control the delivery of air into the mixing chamber and control mechanism is provided and so coupled with the component material delivery valve means and the air delivery valve means that upon the actuation of the control mechanism to initiate delivery of component materials and air into the mixing chamber, the air valve means is first opened to deliver air into the chamber and the component material means is thereafter opened to deliver component materials into the mixing chamber. In the shutting off of delivery of air and component materials to the mixing chamber, the component material valve means is first shut off and air is permitted to flow through the mixing chamber for a limited time thereafter.

A meritorious feature of the invention as described in the preceding paragraph is that the delivery of component materials into the mixing chamber is accomplished by a combination of two valve means, one located within the gun and acted upon directly by the gun control mechanism, and the other located remote from the gun and acted upon indirectly by the gun control mechanism.

Other objects, advantages, and meritorious features of the invention will more fully appear from the following description, claims, and accompanying drawings, wherein:

FIG. 1 is a side elevation of a gun embodying the invention;

FIG. 2 is a cross sectional view lengthwise through the gun showing the valves therein closed;

FIG. 3 is a cross sectional view taken on the same line as FIG. 2 and showing the valves open;

FIG. 4 is a transverse sectional view taken on the line 4—4 of FIG. 2;

FIG. 5 is a cross sectional view through a modification of a part of the control mechanism as compared with the part shown in FIGS. 2 and 3;

FIG. 6 is a longitudinal sectional view through component material valve means disposed remote from the gun and adapted to regulate delivery of component materials to the gun;

FIG. 7 is a plan of the valve mechanism shown in section in FIG. 6;

FIG. 8 is a diagram of apparatus associated with the gun including valve mechanism and fluid lines for delivery of air and component materials to the gun showing the component lines leading to the gun as being open; and FIG. 9 is a schematic diagram illustrating the same apparatus shown in FIG. 8 but showing the component material lines leading to the gun as closed.

The construction of the gun is illustrated particularly in FIGS. 1–4. In FIG. 1 the gun is shown as having a handle 10, a barrel portion 12, and a control member of a trigger cock 14, which is pivoted to the gun frame at 16. Air may be delivered from any suitable source of pressure by a hose 18 to pass through a passageway in the handle to enter an air chamber indicated in FIGS. 2 and 3 as 20. The frame or barrel portion 12 of the gun is provided with a nozzle 22 which is held against the forward end of the gun by a cup-shaped nut 24 threadedly received upon the externally threaded outer end 26 of the gun barrel as shown in FIGS. 1, 2, and 3.

This nozzle portion 22 may be of any desired shape and size of orifice delivery and may terminate in any type of delivery nozzle spout. The nozzle portion 22 in combination with a chamber portion 28 constitutes the mixing chamber portion of the gun. The chamber portion 28 is seated upon the outer end of the gun as shown in FIGS. 2 and 3. It is located thereon by a locating pin 30 or the like shown in FIGS. 2 and 3. It is held in place by the same cup-shaped retaining nut 24 which holds the nozzle portion 22 thereagainst. The space enclosed between the outer face of this chamber portion 28 and the interior of the nozzle 22 constitutes the mixing chamber of the gun. This mixing chamber is divided into an outer compartment indicated as 32 and located wholly within the nozzle part 22 and an inner compartment identified as 34. These two compartments are separated by a foraminous partition 36.

This partition may be formed of "Teflon" or any other suitable material which is inert to the action of the component materials that might be used in the gun. It may be provided with such number of openings 38 therethrough as may be found suitable for the ingredients being used. The size of the openings will also depend upon the character of the component materials being mixed together. It is apparent that this foraminous partition can be changed by removal of the nut 24 and the nozzle portion 22.

The end of the gun barrel or frame rearwardly of the mixing chamber portion 28 is cut out as indicated at 40 to provide what might be termed an air manifold chamber to the rear of the mixing chamber. This air manifold chamber communicates with the mixing chamber through passageways 42, a plurality of which are provided surrounding component delivery tubes 44 and 46 two of which are shown in FIGS. 2 and 3 and which component delivery tubes extend through the air manifold chamber 40 and through the wall into the interior of the mixing chamber as shown particularly in FIGS. 2 and 3 and as hereinafter more particularly described.

Air is admitted from the air chamber 20 heretofore referred to into the air manifold chamber 40 by means of a valve controlled passageway 48 which is shown particularly in FIGS. 2 and 3. This passageway 48 is provided with a plurality of outlets 50 which extend therefrom into the chamber 40. These are best shown in FIGS. 2 and 4 in solid line and in FIG. 3 in dotted outline. Four such outlets are shown in FIG. 4.

Delivery of air through the passageway 48 into the manifold chamber 40 is controlled by a piston-like valve element 52 which is disposed within the air chamber 20 and is carried by a stem or rod 54. This rod is slidably supported for reciprocation through a threaded plug 56 which plug is threaded into the barrel of the gun 12 as shown in FIGS. 2 and 3. 58 represents a separate spacer plug. This valve is actuated to open and close the air passageway 48 by swingable movement of the trigger handle 14. This handle 14 is shown as bifurcated at 15 and the two bifurcations identified as 15 are shown particularly in FIGS. 2 and 3 and they are adapted to bear against a cross piece 60 mounted upon the rod 54 by a cooperating pair of nuts 62 as shown in FIGS. 2 and 3. A spacer 64 encircles the rod and bears at one end against one of the nuts 62 and at the opposite end against a spring 66. The spring 66 is seated within a cup-shaped nut 68 as shown in FIGS. 2 and 3 and resiliently resists withdrawal of the valve rod 54 as is apparent from FIGS. 2 and 3 so as to tend to hold the valve 52 to its seat to prevent flow of air through the passageway 48. The air which enters the handle through the hose 18 travels through a passageway which terminates in the chamber 20 heretofore described through an inlet 21 shown in solid and dotted line in both FIGS. 2 and 3.

The component delivery tubes 44 and 46 heretofore mentioned and shown as discharging into the inner compartment 34 of the mixing chamber in FIGS. 2 and 3 are in the form of needle tubes which extend slidably through the forward portion of the frame of the gun as shown in FIGS. 2 and 3. A spacer element 70 is shown as encircling each needle tube and it carries a packing gland 72 as shown in FIGS. 2 and 3. A retaining nut 74 also encircles each tube and holds the spacer and packing gland in place while permitting reciprocation of the tube therethrough. There is mounted upon each tube a plate or abutment 76 which is adapted to be engaged by the forked end 78 of the cross piece 60. This bifurcated engagement of the forked end 78 is shown in FIG. 1 as well as in FIGS. 2 and 3.

An expansion spring 80 encircles each tube and is disposed between the abutment 76 and a plate 82 which plate is held in position by a threaded plug 84 as shown in FIGS. 2 and 3. This plug 84 is threaded into the rear part of the gun frame as shown and constitutes a connection for a delivery hose 86 as shown in FIG. 2. Each delivery hose 86 serves as a conduit for the delivery of component or ingredient material into the space 88 formed within the plug as shown in FIGS. 2 and 3.

Each needle tube terminates in a threaded part 90 at its rear end and a stop element 92 is held thereon by a threaded stud 94 which closes the rear end of the needle tube. The tube itself is provided with a transverse passageway 96 extending therethrough and communicating with the bore 47 of the tube. It will be seen that when the needle tubes are withdrawn as shown in FIG. 3, these transverse passageways 96 are open to the interior of the space 88 in the plugs 84 so that component material can pass therethrough and down the bore 47 for discharge out of the forward ends of the needle tubes.

Such component materials are delivered under pressure from suitable source supplies as shown in schematic FIGS. 8 and 9. A tank is shown as divided by a partition into two compartments 98 and 100. A discharge line 102 leads from compartment 100 to a control valve mechanism 104. A bypass line 106 leads from the control valve mechanism 104 back to the tank 100. A discharge line 108 leads from compartment 98 to the same control valve mechanism 104 and a bypass line 110 leads from this control valve mechanism back to the source tank 98.

This control valve apparatus is interposed between the gun and the source of component materials and controls the flow of component ingredients from the source to the gun. The gun is indicated in FIGS. 8 and 9 as 112. Two component delivery lines 114 and 116 lead from opposite ends of a control valve mechanism 104 to the gun to deliver component ingredients thereto. An air line 118 also leads to the gun to deliver air thereto from a suitable source of pressure. The control trigger element is indicated in FIGS. 8 and 9 as 14 as it is FIG. 1.

The assembly for delivering component materials from the control valve and from the source of such materials to the gun includes a pneumatic pilot valve 122. This is a four-way valve and has an air inlet line 124, an air exhaust line 126, and two air lines 128 and 130 leading from the pilot valve to the control valve 104. The gun itself is provided with a poppet valve 132 and an air line 134 leads therefrom to the pilot valve.

The control valve 104 is shown in detail in FIGS. 6 and 7. It comprises a cylinder 136 supported upon a frame 138. Within this cylinder is a piston 140 carrying a piston rod 142 which extends in both directions therefrom. Connected to one end of the piston rod by a coupling 144 is a valve rod 146. Connected to the opposite end of the piston rod 142 by a coupling 148 is a valve rod 150. Each end of the frame is provided with a valve chamber. The chamber associated with the valve rod 146 is indicated as 152. That associated with the valve rod 150 is indicated as 154.

Valve chamber 152 is connected with the component compartment 100 by the delivery line 102 and the bypass line 106. Valve chamber 154 communicates with the component source 98 by a delivery line 108 and a bypass line 110, all as shown in FIGS. 8 and 9. Valve chamber 152 has a delivery line 114 leading to the gun. Valve chamber 154 has a delivery line 108 leading to the gun.

The valve chamber block 152 is provided with a valve chamber proper 156 and the valve rod 146 is cut away as shown at 158. When the parts are disposed as shown in FIG. 6, the component lines 102 and 106 are in communication as shown in FIG. 9 and component material pumped under pressure in any suitable manner from component source 100 flows from such source to the control valve chamber 156 through the feed line 102 and is returned from this chamber back to the source through the bypass line 106.

When the parts are in this position, namely, FIG. 6, the same bypass circulation occurs between the component compartment 98 and the opposite end of the gun, it will be seen that the opposite end of the gun has a valve chamber block 154 which is provided with a valve chamber proper 160 and that the valve rod 150 is cut away as at 162 and in the position shown in FIG. 6 the delivery line 108 and the bypass line 110 communicate with each other through the valve chamber 160. It will also be seen that this disposition of parts of FIG. 6 is that shown in the diagram of FIG. 9. In FIG. 9 the lines 114 and 116, which lead to the gun, are closed as shown in FIG. 6.

When the valve rod assembly is moved in the opposite direction or to the left in FIG. 6, the reduced portions 158 and 162 of the valve rod will establish communication between the component delivery lines 102 and 108 and the component discharge lines 114 and 116 respectively. In this position, which is illustrated in FIG. 8, component materials would be delivered from the source compartments 98 and 100 through lines 102 and 108 to the control valve assembly, and through such control valve assembly and lines 114 and 116 to the gun itself.

The actuation of the control valve is carried out by pneumatic control exercised thereover by the pilot valve from the poppet valve on the gun. The pilot valve, which is shown schematically in FIGS. 8 and 9, normally stands in the closed position and in such position air enters the pilot valve through the line 124 and flows therethrough and to the poppet valve through line 134 and to the control valve through line 130. With air entering the control valve through line 130, the piston 140 is held to the right and the valve mechanism is in the position shown in FIG. 6 so that component materials are bypassed. It will be noted that in this position, which is that of FIG. 9, the delivery lines for component materials from the control valve to the gun are closed.

When the gun is placed in operation, the trigger 14 is manually retracted. Swingable retraction of the trigger moves the air valve stem 54 to the rear and opens the air valve 52 so that air flows from its source remote from the gun through the mixing chamber compartments 34 and 32. As heretofore described, the air enters the air manifold 40 through passageways 48 and 50 and flows from such air manifold through passageways 42 into the rear portion 34 of the mixing chamber. As also heretofore described the trigger 14 has forks 15 which engage the cross piece 60 carried by the valve stem 54. As the valve stem 54 is moved rearwardly, the cross piece 60 through the abutments 76 on the needle tubes 44 and 46 withdraws these needle tubes from the position shown in FIG. 2 to that shown in FIG. 3. In the position shown in FIG. 3, each needle tube has its passageway 96 moved into the space 88 so that communication is established between such space and the bore 47 of each needle tube.

This initial rearward movement of the trigger 14, though it institutes the flow of air and retracts the needle tubes, does not initiate the flow of component materials from the source to the gun because the control valve shown in FIGS. 6 and 7 is in the position there shown and is closing the delivery lines leading to the gun. The poppet valve 132 is an ordinary poppet valve but responds to pressure of the trigger 14 against the valve plunger 133 so that when the plunger is actuated, the valve is opened to discharge air to the atmosphere. The valve 132 communicates by a separate air line 134 with the pilot valve. It is normally full of air under pressure from the pilot valve. When it is opened to the atmosphere, the air exhausts and the pilot valve shifts from the position of FIG. 9 to that of FIG. 8. It will be seen, however, that the poppet valve is not actuated until the trigger reaches the last portion of its stroke.

When the pilot valve is reversed from the position shown in FIG. 9 to that of FIG. 8, the air line 134 leading to the poppet valve is closed and the air line 130 leading to the control is closed but the air line 128 leading to the control valve is opened and the control valve is shifted from the position shown in FIGS. 6 and 9 so that component materials are delivered through the open lines 114 and 116 to the gun. These lines shown in 114 and 116 schematically in FIGS. 8 and 9 terminate in delivery conduits 86 as shown in FIG. 2, which discharge into the chambers 88 that communicate with the interior of the needle valve tubes 44 and 46 all as shown in FIGS. 2 and 3.

It will be seen, therefore, that the operation is one in which, when the trigger is manually drawn to the rear, the air valve is opened to discharge air through the mixing chamber to exhaust any residue of unused components that might have remained therein and to thoroughly clean out the chamber. The needle valve tubes are also retracted to a position of open communication with the component delivery chambers that receive component materials from the conduits 86 through the lines 114 and 116 from the control valve 104. The control valve 104, however, remains closed until the poppet valve plunger 133 is actuated by the trigger 14. When this occurs, the poppet valve exhausts air from the atmosphere, which causes the pilot valve to shift and reverse the position of the control valve piston so that the control valve places the component material sources 98 and 100 in communication with the gun. Component materials are then delivered under pressure to the gun and entering the mixing chamber they are commingled and diffused with each other through the air entering the chamber. This diffusion occurs in the interior portion 34 of the mixing chamber. The materials react with each other so that a reacted mixture is blown through the foraminous plate 36 passing through the multiplicity of apertures 38 and to the outer portion of the chamber 32 from which it is discharged through the nozzle. The presence of the foraminous plate facilitates the completion of the reaction by keeping the materials in the interior portion of the mixing chamber in contact with each other and being commingled together for that period of time necessary to induce the chemical reaction.

The component material mixture is delivered from the gun so long as the trigger is held back to hold the control valve in position to produce delivery of such materials to the gun. When the trigger is released and moved forwardly under the control springs acting on the pilot valve and the needle tubes, the delivery of component materials to the gun is first discontinued. As soon as the poppet valve is closed, the pilot valve reverses its position and assumes that of FIG. 9. The control valve reverses its position and component materials are then bypassed through the control valve back to the source and are no longer delivered to the gun. During the period of time that the trigger 14 is returning to its original position as shown in FIGS. 2 and 1 (and the operator permits this return to occur slowly), air is being passed through the mixing chamber to blow out all the component mixture remaining therein. This manual control is a satisfactory arrangement when the operator is careful. In order to assure that such will of necessity result, there is provided as shown in FIG. 5 a check assembly which would be substituted for the spring 66 and threaded cap 68 shown in FIGS. 2 and 3.

This check assembly includes a spring 170 seated within a plug 172 which is externally threaded at 174 to be received within the threaded portion of the frame in lieu of the threaded plug 68. The spring 170 acts upon the part 176, which corresponds to the part 64 in the construction previously described and the spring 170 resists the withdrawal of the valve stem 54 in the same manner that the spring 66 resists its withdrawal. The spring cavity is provided with a bleed passageway 178 leading therefrom to the atmosphere. It is also provided with an air outlet passageway 180 controlled by a ball check 182 held by a spring 184 and also leading to the atmosphere through an outlet 186. The end of the valve rod 54 is included as at 55 so that when the valve rod is completely retracted it unseats the ball 182 and opens the spring cavity to the atmosphere.

The rearward movement of the valve rod, however, is slowed up by virtue of the fact that the air in the spring cavity can escape ahead of the plug 176 only through the bleed passageway 178. The plug 176 is shown as having a sealing gasket 188. When the valve rod is completely retracted, the ball is unseated and the interior of the spring cavity is opened to atmosphere not only through the bleed passageway 178 but through the ball control passageway. It will be seen that this arrangement will automatically check the pulling back of the trigger so that air will be permitted to flow through the mixing chamber preceding the mass of component materials therethrough. When the trigger arrives near the end of its withdrawal movement, the ball check is unseated and it is permitted to move the last portion of swing rapidly. When the trigger is released, as soon as the valve stem 54 has moved to permit seating of the ball check 182, admission of air through the bleeding opening 178 is sufficiently slow so that the depression which is developing slows up the closing of the air valve 52 and air is permitted to flow through the mixing chamber to exhaust unused component mixture therefrom.

What I claim is:

1. A component mixture delivery gun having a mixing chamber provided with a component mixture discharge outlet, means for delivering component materials into the chamber, means for delivering air under pressure into the chamber, manually operable control mechanism coupled with said air delivery means and with said component material delivery means to control the delivery of air and component materials into the chamber and so coupled with said air and component material delivery means that the delivery of air into the chamber, is initiated prior to the delivery of component materials thereinto and the delivery of component materials into the chamber is stopped prior to the stopping of the delivery of air thereinto, and a regulating device coupled with said control mechanism and responsive to manual movement thereof adapted to slow up the movement thereof initiating the delivery of component materials into the chamber and adapted to slow up the shutting off of the delivery of air thereinto following the shutting off of the delivery of component materials thereinto.

2. A component mixture delivery gun having a mixing chamber provided with a component mixture discharge outlet, means for delivering component materials into the chamber, means for delivering air under pressure into the chamber, manually operable control mechanism coupled with said air delivery means and with said component material delivery means to control the delivery of air and component materials into the chamber and so coupled with said air and component material delivery means that the delivery of air into the chamber is continued for a period of time after the delivery of component materials thereinto has been discontinued, a regulating device coupled with said control mechanism and responsive to manual movement thereof adapted to slow up movement thereof in shutting off delivery of air into the chamber following the shutting off of the delivery of component materials thereinto.

3. In a component mixture delivery gun, a mixing chamber for component materials having an outer compartment and an inner compartment separated by a foraminous partition, said outer compartment provided with a component mixture discharge outlet, means for delivering component materials into said inner compartment, means for delivering air under pressure into said inner compartment to diffuse the component materials received therein and to blow the mixture thereof through the foraminous partition into the outer compartment and control means for regulating the delivery of air and of said component materials into said inner compartment including regulating mechanism responsive upon actuation of initiation of delivery of component materials and air into the mixing chamber to initially institute delivery of air into the mixing chamber and thereafter to institute delivery of component materials thereinto.

4. In a component mixture delivery gun, a mixing chamber for component materials having an outer compartment and an inner compartment separated by a foraminous partition, said outer compartment provided with a component mixture discharge outlet, means for delivering component materials into said inner compartment, an air manifold chamber adjacent to said inner compartment communicating therewith through a plurality of air passages, means for delivering air under pressure to said manifold chamber to pass through said air passages into the inner compartment to diffuse component materials delivered in said inner compartment and control means for regulating the delivery of air and component materials into said mixing chamber including regulating mechanism responsive upon actuation to discontinue delivery of component materials and air to discontinue delivery of component materials prior to discontinuance of delivery of air to the mixing chamber.

5. In association with a component mixture delivery gun connected with two sources of component materials by a component material delivery line extending from each source to the gun, valve mechanism controlling the flow of component materials through said two lines comprising a valve in each material component delivery line, a piston coupled with said valve mechanism to open and close both valves, fluid pressure means coupled with said piston to deliver fluid pressure to actuate the piston, said fluid pressure means coupled with the gun to be responsive to the movement of the control mechanism mounted on the gun.

6. A component mixture delivery gun having a mixing chamber for component materials provided with a mixture discharge outlet and provided with a plurality of component material inlets through which separate components are delivered into the chamber and provided with an air inlet through which air under pressure is delivered into the chamber, valve means controlling the delivery of component materials into the chamber, valve means controlling the delivery of air under pressure into the chamber, manually operable control mechanism coupled with said air valve means and with said component material valve means to actuate the same to regulate the delivery of component materials and air into the mixing chamber, said gun characterized in that the mixing chamber comprises an outer portion which is provided with the discharge outlet and an inner portion into which component materials are delivered, which outer and inner portions are separated from each other by a foraminous partition provided with a plurality of apertures therethrough, and characterized further in that an air manifold is disposed adjacent to the inner portion of the mixing chamber and the component material delivery means thereto is in the form of at least two delivery tubes that extend through such adjacent manifold and into the inner portion of the mixing chamber for discharge thereinto and the air delivery means discharges air directly into the air manifold and such air manifold communicates with the inner portion of the mixing chamber by a plurality of air passageways which encircle the component delivery tubes that discharge into the inner portion of the mixing chamber.

7. A component mixture delivery gun having a mixing chamber for component materials provided with a mixture discharge outlet and provided with a plurality of component material inlets through which separate components are delivered into the chamber and provided with an air inlet through which air under pressure is delivered into the chamber, valve means controlling the delivery of component materials into the chamber, valve means controlling the delivery of air under pressure into the chamber, manually operable control mechanism coupled with said air valve means and with said component material valve means to actuate the same to regulate the delivery of component materials and air into the mixing chamber, said gun characterized in that the component material valve means includes valve means within the gun directly responsive to said manually operable control mechanism to open concurrently with the opening of the air valve means and also includes auxiliary valve means disposed remote from the gun responsive to open to permit flow of component materials to the gun only following the opening of the air valve means.

8. A component mixture delivery gun having a mixing chamber for component materials provided with a mixture discharge outlet and provided with a plurality of component material inlets through which separate components are delivered into the chamber and provided with an air inlet through which air under pressure is delivered into the chamber, valve means controlling the delivery of component materials into the chamber, valve means controlling the delivery of air under pressure into the chamber, manually operable control mechanism coupled with said air valve means and with said component material valve means to actuate the same to regulate the delivery of component materials and air into the mixing chamber, said gun characterized in that a plurality of component material delivery lines each communicating with a source of component material communicate one with each of said inlets, and the component material valve means includes valve means remote from the gun disposed in the component materials delivery lines leading to the gun, bypass component material lines communicating with the component material delivery lines leading to the gun to provide a bypass for component materials about the gun, which said last named valve means is operable to open the two component materials delivery lines leading to the gun to deliver component materials thereto and is operable to close said two component materials delivery lines leading to the gun and to open said bypass lines through which said component materials may be bypassed around the gun.

9. A component mixture delivery gun having a mixing chamber for component materials provided with a mixture discharge outlet and provided with a plurality of component material inlets through which separate components are delivered into the chamber and provided with an air inlet through which air under pressure is delivered into the chamber, valve means controlling the delivery of component materials into the chamber, valve means controlling the delivery of air under pressure into the chamber, manually operable control mechanism coupled with said air valve means and with said component material valve means to actuate the same to regulate the delivery of component materials and air into the mixing chamber, said gun characterized in that a plurality of component material delivery lines each communicating with a source of component material communicate one with each of said inlets, and bypass lines for component materials communicating with the component material delivery lines leading to the gun from the source of component materials to bypass component materials about the gun and back to the source of component materials, said valve means for controlling the delivery of component materials into the mixing chamber of the gun comprising a piston-like apparatus shiftable in one direction under fluid pressure to open two component material delivery lines leading to the gun and shiftable in the opposite direction to close said two component material delivery lines and open a bypass line for each component material delivery line.

10. A component mixture delivery gun having a mixing chamber provided with a component mixture discharge outlet, means for delivering component materials into the chamber, means for delivering air under pressure into the chamber, manually operable control mechanism coupled with said air delivery means and with said component material delivery means to control the delivery of air and component materials into the chamber and so coupled with said air and component material delivery means that the delivery of air into the chamber is initiated prior to the delivery of component materials thereinto and the delivery of component materials into the chamber is stopped prior to the stopping of the delivery of air thereinto, and a regulating device coupled with said control mechanism and responsive to manual movement thereof adapted to slow up the movement thereof in initiating the delivery of component materials into the chamber and adapted to slow up the shutting off of the delivery of air thereinto following the shutting off of the delivery of component materials thereinto, said gun characterized in that the component material valve means includes valve means within the gun directly responsive to said manually operable control mechanism to open concurrently with the opening of the air valve means and also includes auxiliary valve means disposed remote from the gun responsive to open to permit flow of component materials to the gun only following the opening of the air valve means.

References Cited in the file of this patent

UNITED STATES PATENTS

| | | |
|---|---|---|
| 1,960,724 | Bramsen | May 29, 1934 |
| 1,987,248 | Seizer | Jan. 8, 1935 |
| 2,048,912 | Ziska et al. | July 28, 1936 |
| 2,529,656 | Hottelsater | Nov. 14, 1950 |
| 2,635,010 | Sanders et al. | Apr. 14, 1953 |

FOREIGN PATENTS

| | | |
|---|---|---|
| 627,440 | Great Britain | Aug. 9, 1949 |